Feb. 27, 1962

R. C. WAPPNER 3,022,671

THERMOMETER SUPPORT

Filed Aug. 1, 1957

INVENTOR.
RALPH C. WAPPNER
BY Tom Walker
ATTORNEY

United States Patent Office 3,022,671
Patented Feb. 27, 1962

3,022,671
THERMOMETER SUPPORT
Ralph C. Wappner, Springfield, Ohio, assignor to The Ohio Thermometer Company, Springfield, Ohio, a corporation of Ohio
Filed Aug. 1, 1957, Ser. No. 675,736
8 Claims. (Cl. 73—375)

This invention relates to thermometers, and particularly to brooder or like thermometers which are adapted to be suspended from the roof of a structure to respond to the interior temperature thereof but to be accessible from outside the structure for installation and removal.

The object of the invention is to simplify the construction as well as the means and mode of operation brooder thermometers whereby such thermometers may not only be economically manufactured, but will be more efficient and satisfactory in use, adaptable to a wide variety of applications, and be unlikely to get out of order.

A further object of the invention is to present a generally new construction for brooder or like thermometers wherein the characteristics of devices of this kind are embodied in an article produced by a plastic molding or like process.

Another object of the invention is to obviate the need for thermometers of different size for use with brooders of different depth, the instant thermometer being adjustable in such manner that it may selectively be shortened and lengthened.

A further object of the invention is to present disc suspension means so constructed with reference to that part of the thermometer upon which it is mounted that it is tiltable relatively to the thermometer for proper vertical suspension thereof and yet frictionally engages the thermometer to resist relative longitudinal sliding motion of the disc upon the thermometer.

A further object of the invention is to provide a brooder thermometer possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a view in front elevation of a brooder or like thermometer in accordance with the illustrated embodiment of the invention;

FIG. 6 is a detail plan view of the disc means above referred to.

Like parts are indicated by similar characters of reference throughout the several views.

Figure 5:
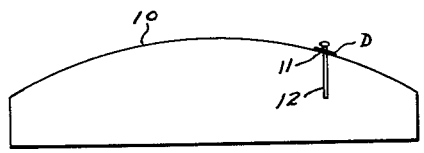
FIG. 5 is a diagrammatic view of a brooder, showing a thermometer in accordance with the instant invention mounted therein, indicating the purpose of the tiltable disc means forming a part of the thermometer structure.

Referring to the drawings, a conventional brooder has, as shown in FIG. 5, a sloping roof 10 in which is an opening 11 to receive a thermometer 12. As indicated, a major part of the thermometer 12 projects into the interior of the brooder where it may be subject to and respond to the interior temperature. A relatively minor part of the thermometer projects through and above the roof 10 and serves as a handle or grip portion by which the thermometer may be removed for reading and by which it may be reinserted. Intermediate the described major and minor portions of the thermometer is a disc means D which acts as a suspension means for the thermometer and which is tiltable relatively thereto in order that the thermometer may hang vertically within the brooder while the suspending disc means accommodates itself to the sloping configuration of the roof.

The instant thermometer structure further comprises, as shown in FIGS. 1 to 4, a scale plate 14 having a longitudinally extending groove 15 in what may be considered to be the front face thereof. The groove 15 mounts a thermometer tube 16 and at one end thereof terminates in a chamber 17 cut through from the front to the back face of the scale plate and providing a place to receive the bulb 18 of the thermometer. The thermometer 16 is held to the scale plate by suitable means, for example by straps 19 and 21. According to a feature of the invention, the scale plate 14 is made by a plastic molding or like process, and is approximately channel shaped in cross section, the side edges of the plate being turned rearward or in the same direction of the protrusion forming the groove 15. At the bottom of the scale plate, portions thereof are reversely bent to define walls 22 and 23 paralleling the side edges of the plate and interconnected by cross bars 24. These, together with cross bars 25 at the front of the scale plate aid in defining the chamber 17 and protect the bulb while permitting a free movement of air therearound.

Further in accordance with the invention, the thermometer comprises a scale plate extension 26 made of one piece plastic material, and, like the scale plate 14, having an essentially channel shaped formation. The extension 26 has a telescoping, interfitting engagement with the upper end of the scale plate 14, or that end opposite the one providing the bulb chamber 17. The extension 26, however, occupies an opposing relation to the scale plate proper in that the turned over side edges of the respective parts interfit with one another, placing the planar body surfaces thereof in parallel spaced apart relation. In the described body surface of the extension 26 is a longitudinal slot 27 through which is passed, from the rear of the scale plate extension member, a self-tapping type of screw 28 adapted to engage in the upper end of the protruded formation defining the groove 15. Such formation extends on the rear surface of the scale plate above the terminus of the groove 15, and at point 29 therein a recess guides and receives the screw 28. Turning the screw 28 into such recess, it will be understood, will serve to clamp the extension member 26 frictionally to the scale plate 14 whereby the extension member may be held in a selected position of longitudinal adjustment relatively to the scale plate. Similarly, loosening of the screw 28 will release the scale plate extension member for relative longitudinal motion. The described construction accordingly affords a means for lengthening and shortening the thermometer to adjust to the dimensions of a given brooder, in order that the thermometer may sense the temperature at the proper level therein.

Figure 1:
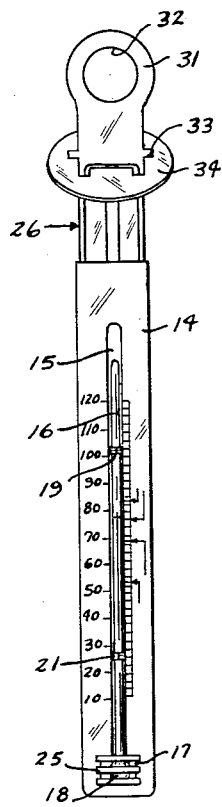
Figure 2:
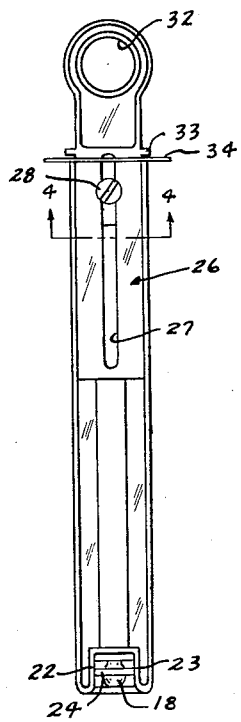
FIG. 2 is a rear elevation of the thermometer of FIG. 1, showing the extensible portion thereof in a fully retracted or minimum position of extension.
Figure 3:
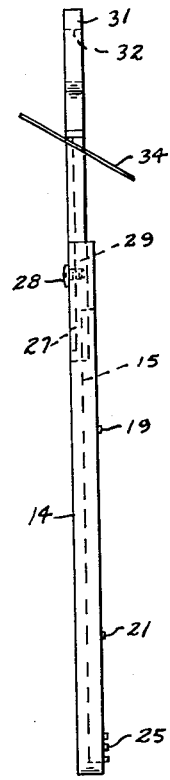
FIG. 3 is a side view of the thermometer, the parts being positioned as shown in FIG. 1.
Figure 4:
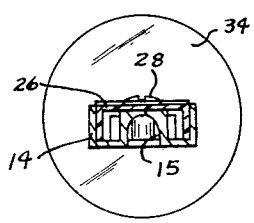
FIG. 4 is a view in cross section, taken substantially along the line 4—4 of FIG. 2.
Figure 6:
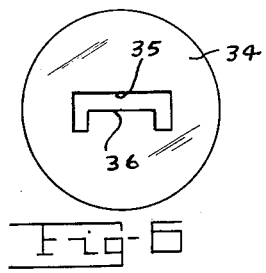

In the telescopic engagement betwen the extension member 26 and the scale plate 14, one end of the extension member is received within and between the turned over side edges of the scale plate. The other end of the extension member projects above or beyond the scale plate and at its extremity has a rounded configuration 31 traversed by an opening 32, which provide for easy grasp of the thermometer facilitating its handling and installation in and removal from the brooder. Intermediate its ends, the extension member 26 is formed with a lateral extrusion defining a shoulder 33. Slidably mounted upon the extension member 26, and in the asembly of the parts occupying a position between the shoulder 33 and the adjacent or upper end of the scale plate 14 is a disc 34 constituting the disc means D of FIG. 5. As shown in FIG. 6, the disc 34 has an opening 35 through which the extension member 26 passes and corresponding in its configuration approximately to the cross sectional shape of the extension member. A tongue portion 36 thereof extends into the space between the turned over side edges of the extension member and stops short of contact with the planar body surface thereof. In one sense, and considering the dimension from front to back thereof the opening 35 is oversize with respect to the extension member 26. In this sense, therefore, the disc 34 is relatively loose on the extension member and so may tilt thereon, as for example from a position at right angles to the plane of the thermometer proper to a relatively inclined position as indicated in FIG. 3. In another sense, and considering the dimension from side to side thereof, the opening 35 more closely corresponds to the lateral dimension of the extension member. A frictional contact between the members is achieved in this sense which resists relative longitudinal sliding motion of the disc. When installed in the roof of a brooder, the thermometer is inserted, as through the opening 11 of FIG. 5, until limited by contact of the disc 34 with the roof and further by contact of the disc 34 with the shoulder 33 on the extension member 26. The thermometer is permitted to hang in a normal vertical fashion from the suspension disc, which adjusts itself to the sloping formation of the roof. Upon withdrawal of the thermometer, the disc remains in its adjusted position of abutment with the shoulder 33 by reason of the frictional contact above described. In removing and re-installing the thermometer, therefore, there is no appreciable sliding movement of the disc 34 between opposing limits as defined by the shoulder 33 and the adjacent or upper end of the scale plate 14, these abutments being in some instances relatively distant from one another.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A brooder or like thermometer, including a scale plate having normal upper and lower ends, a thermometer tube thereon having its bulb end at the normal lower end of the scale plate, an extension slide in telescopic engagement with the normal upper end of the scale plate, means to maintain said extension slide in a selected position of longitudinal adjustment relatively to said scale plate, and a relatively tiltable disc on said extension slide enabling the thermometer to assume a vertical position when suspended by said disc.

2. A brooder or like thermometer, including a scale plate having front and rear faces the former of which is adapted to receive a thermometer tube, the longitudinal side edges of said plate being turned over toward the rear face thereof, a scale plate extension having a sliding fit between the turned over side edges of said scale plate and extending beyond one end of said plate, means to retain said scale plate extension in a longitudinal position of adjustment relatively to the scale plate, and thermometer suspension means on said scale plate extension, said suspension means including a disk mounted on said extension to tilt relatively thereto in a manner to enable the thermometer to assume a vertical position when suspended by said disk.

3. A brooder or like thermometer, including a scale plate, a longitudinally extensible scale plate extension connected in relatively sliding interfitting engagement with one end of said plate, means to retain said scale plate extension in selected longitudinal positions of adjustment relatively to said scale plate, and disc means for suspension of said scale plate extension mounted thereabout for relative longitudinal movement and free tilting motions thereon, said scale plate extension being formed with a shoulder for abutment by said disc means to limit relative longitudinal motion thereof in one direction.

4. Thermometer indicating apparatus comprising a mometer, means mounting said thermometer for suspension thereof including a plate-like member arranged in a transverse connected sense to said thermometer for free and independent tilting and longitudinal adjustment with respect thereto whereby to provide for automatic vertical suspension of said thermometer thereby irrespective of the inclination of the surface or surfaces from which it is suspended, and means for limiting longitudinal adjustment of said plate-like member relative to said thermometer.

5. A brooder or like thermometer comprising means defining a scale plate having a thermometer tube connected in adjacent relation thereto, suspension means connected for free and independent tilting and sliding adjustment longitudinally with respect to said scale plate arranged to automatically provide a vertical suspension thereof irrespective of the inclination of the plane of the surface or surfaces from which it is suspended, and means for limiting relative sliding adjustment of said suspension means.

6. A brooder or like thermometer, including a scale plate having front and rear faces on the former of which is mounted a thermometer tube, said plate further having a normal lower end adapted to accommodate the bulb end of the thermometer tube and having a normal upper end formed in the rear face thereof with a protruded formation, an extension slide having a telescopic engagement with the normal upper end of said scale plate, said extension slide having a longitudinal slot therein, a screw passed through said slot and received in said extruded formation in said scale plate, said screw being adapted to be tightened in said formation to maintain said extension slide in a selected position of adjustment relative to said scale plate, and freely tiltable disc means frictionally related to and adjustable longitudinally of said extension slide adapted to automatically provide vertical suspension of said thermometer tube, irrespective of the inclination of the surface or surfaces from which it is suspended thereby.

7. A brooder or like thermometer, including a scale plate, a longitudinally extensible scale plate extension connected in relatively sliding interfitting engagement with one end of said scale plate, means to retain said scale plate extension is selected longitudinal positions of adjustment relatively to said scale plate, disc means for suspension of said scale plate extension mounted thereabout for relative longitudinal and tilting motions, said scale plate extension being formed with a shoulder for abutment by said disc means, said scale plate extension being received within one end of said scale plate and the said one end of said scale plate serving also as an abutment for said disc means in opposing relation to said shoulder on said extension.

8. A brooder or like thermometer, including a scale plate, a longitudinally extensible scale plate extension connected in relatively sliding interfitting engagement with one end of said scale plate, means to retain said scale plate extension in selected longitudinal positions of adjustment relatively to said scale plate, disc means for suspension of said scale plate extension mounted thereabout for relative longitudinal and tilting motions, said scale plate extension being formed with a shoulder for abutment by said disc means, said disc means comprising a disc having an opening receiving said scale plate extension therethrough, said opening being relatively elongated in one sense to permit of said tilting motion and close fitting upon the scale plate extension in another sense whereby frictionally to retain the disc in set longitudinal positions of adjustment thereon.

References Cited in the file of this patent

UNITED STATES PATENTS

| | | |
|---|---|---|
| 259,235 | Stieringer | June 6, 1882 |
| 545,727 | Rockstroh et al. | Sept. 3, 1895 |
| 553,231 | Eastman | Jan. 21, 1896 |
| 1,141,500 | Stahle | June 1, 1915 |
| 1,225,570 | Brown | May 8, 1917 |
| 1,339,288 | Richards | May 4, 1920 |
| 1,883,272 | Zeliner | Oct. 19, 1932 |
| 1,929,606 | Phelan | Oct. 10, 1933 |

FOREIGN PATENTS

| | | |
|---|---|---|
| 6540/32 | Australia | Mar. 23, 1933 |
| 845,064 | France | May 8, 1939 |